(12) United States Patent
Niedermeier et al.

(10) Patent No.: US 12,232,231 B2
(45) Date of Patent: Feb. 18, 2025

(54) ELECTRONIC LOAD TO INSTALL IN THE POWER SUPPLY OF A VEHICLE LAMP

(71) Applicant: OSRAM GmbH, Munich (DE)

(72) Inventors: Peter Niedermeier, Munich (DE); Isabel Rupprecht, Elchingen (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 18/041,063

(22) PCT Filed: Jun. 10, 2021

(86) PCT No.: PCT/EP2021/065680
§ 371 (c)(1),
(2) Date: Feb. 8, 2023

(87) PCT Pub. No.: WO2022/033744
PCT Pub. Date: Feb. 17, 2022

(65) Prior Publication Data
US 2023/0300959 A1    Sep. 21, 2023

(30) Foreign Application Priority Data

Aug. 12, 2020   (DE) .................... 10 2020 210 254.6

(51) Int. Cl.
*H05B 45/3575*    (2020.01)
*B60Q 1/00*    (2006.01)
(Continued)

(52) U.S. Cl.
CPC ....... *H05B 45/3575* (2020.01); *B60Q 1/0088* (2013.01); *F21S 41/141* (2018.01); *H05B 45/50* (2020.01); *G05F 1/613* (2013.01)

(58) Field of Classification Search
None
See application file for complete search history.

(56) References Cited

U.S. PATENT DOCUMENTS

| | | |
|---|---|---|
| 9,544,970 B2 | 1/2017 | Dunser et al. |
| 10,638,568 B2 | 4/2020 | Niedermeier et al. |
| (Continued) | | |

FOREIGN PATENT DOCUMENTS

| | | |
|---|---|---|
| DE | 10107578 A1 | 8/2002 |
| DE | 10215486 C1 | 10/2003 |
| (Continued) | | |

OTHER PUBLICATIONS

Texas Instruments, "TL431 / TL432 Precision Programmable Reference", document SLVS543P, Aug. 2004—revised Nov. 2018, www.ti.com, 83 pages.

*Primary Examiner* — Anh Q Tran
(74) *Attorney, Agent, or Firm* — SLATER MATSIL, LLP (57) ABSTRACT

In an embodiment an electronic load for installation in a power supply of a vehicle lamp includes a first connection node connected to two first connection sections adapted to be connected between respective corresponding connection sections of a first line carrying a voltage potential, a second connection node connected to two second connection sections adapted to be connected between respective corresponding connection sections of a second line carrying a reference potential, wherein a difference between the voltage potential and the reference potential comprises a supply voltage configured to be supplied to the vehicle lamp and a current sink circuit coupled between the first and second connection nodes, the current sink circuit configured to cause a substantially constant current flow independently of a time-varying supply voltage from at least one of the first connection sections to at least one of the second connection sections.

17 Claims, 3 Drawing Sheets

(51) Int. Cl.
*F21S 41/141* (2018.01)
*G05F 1/613* (2006.01)
*H05B 45/50* (2022.01)

(56) References Cited

U.S. PATENT DOCUMENTS

| | | | |
|---|---|---|---|
| 2014/0111107 A1* | 4/2014 | Cheng | H05B 45/3575 |
| | | | 315/291 |
| 2018/0279434 A1* | 9/2018 | Matsui | H05B 45/3575 |
| 2019/0150236 A1 | 5/2019 | Niedermeier et al. | |

FOREIGN PATENT DOCUMENTS

| | | | | |
|---|---|---|---|---|
| DE | 10359196 A1 | 7/2005 | | |
| DE | 102006018308 A1 | 10/2007 | | |
| DE | 102008042595 B3 | 11/2009 | | |
| DE | 102008048197 A1 * | 3/2010 | | B60Q 11/00 |
| DE | 102012224141 A1 | 6/2014 | | |
| DE | 102019206461 A1 | 11/2020 | | |
| WO | 2014094016 A2 | 6/2014 | | |
| WO | 2017191270 A1 | 11/2017 | | |

\* cited by examiner

ELECTRONIC LOAD TO INSTALL IN THE POWER SUPPLY OF A VEHICLE LAMP

This patent application is a national phase filing under section 371 of PCT/EP2021/065680, filed Jun. 10, 2021, which claims the priority of German patent application 10 2020 210 254.6, filed Aug. 12, 2020, each of which is incorporated herein by reference in its entirety.

TECHNICAL FIELD

Various embodiments relate to an electronic load for incorporation or insertion into the power supply of a vehicle lamp. Further aspects may relate to a method of supplying electrical power to a retrofit lamp used in a vehicle lamp, which may comprise a semiconductor light source.

BACKGROUND

Retrofit lamps with semiconductor light sources are used as illuminants in particular in motor vehicles, where they are increasingly being used as replacements for conventional halogen lamps. They offer advantages such as cost savings, greater flexibility, e.g. with regard to the color temperatures that can be displayed, durability and, above all, energy savings, etc. compared with halogen lamps. Retrofit replacement lamps regularly have the same socket type as the halogen lamp they are intended to replace, e.g. H4, H7 or H11, etc. For example, an LED retrofit lamp for the H7 type consumes about 3 times less electrical power than the corresponding H7 halogen lamp with roughly comparable luminous flux. At a given nominal or supply voltage of, say, 12 V or 24 V, the LED retrofit lamp accordingly draws 3 times less current (about 1 amp). Similarly, for example, an LED retrofit lamp for the H7 type offers about 7 to 8 times the life or operating time of a corresponding H7 halogen lamp.

Figure 1:
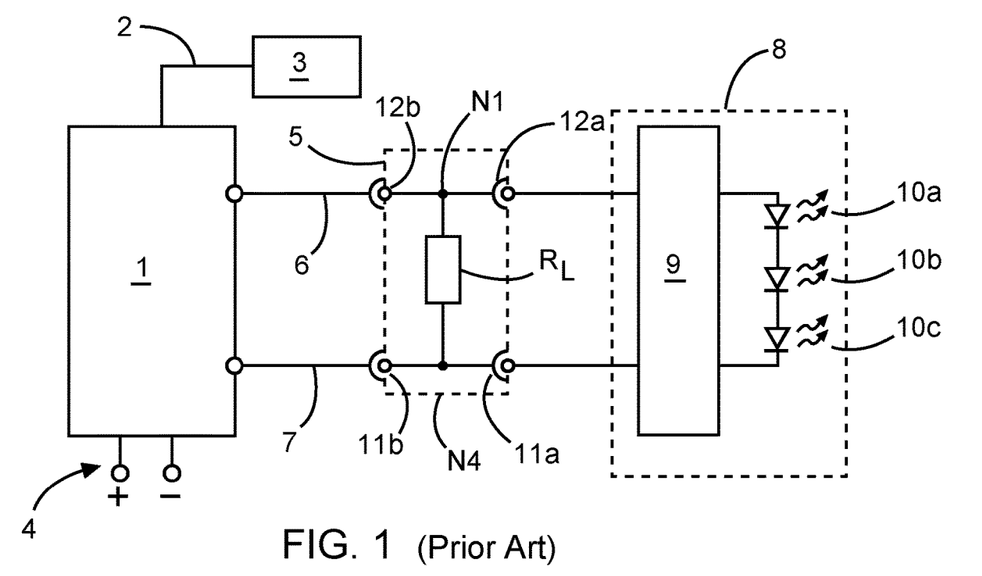
FIG. 1 block diagram showing an on-board power supply control unit and a vehicle lamp operated by it with a load resistor device connected upstream in parallel with the lamp in accordance with the state of the art.

In motor vehicles, the supply voltage delivered by the respective battery is regularly fed to the vehicle lamp by an on-board power supply control unit (BCM) of the vehicle. A schematic diagram of a known arrangement is shown in FIG. 1. The on-board power system control unit 1 is connected via a communication bus 2, which may be in the form of a CAN bus, to further electronic detection and/or control devices 3, including the operating and display devices at the driver's end and any sensors which detect external lighting conditions, etc. The power supply 4 supplied by the battery is fed via lines 6, 7 to the vehicle lamp 8, which in the example shown is designed as an LED retrofit lamp and has an LED driver circuit 9 and LEDs 10a, 10b, mc (light-emitting diodes). The number of LEDs as well as their interconnection (in series or parallel) may vary in the figures shown in this application, and the embodiments and aspects described further below are not dependent on the exact embodiment of the vehicle lamp. The vehicle lamp may have a specific socket type, for example H7 etc., and may be plugged into a corresponding slot of a vehicle lamp, for example a headlamp (low beam or high beam), a brake light or turn signal etc.

If the vehicle lamp 8 fails, for example because in the case of a conventional halogen bulb used in the lamp the filament burns out and breaks, or because in the case of an LED retrofit lamp used in the lamp one of the LEDs 10a-10c becomes highly resistive, this can be signaled to the driver by corresponding fault detection by the vehicle electrical system control unit 1 so that the driver can replace the vehicle lamp 8 with a functioning new lamp. In order for the vehicle electrical system control unit 1 to detect the fault, it is equipped with a corresponding measuring circuit (not shown) which is designed to measure the current drawn by the vehicle lamp 8 (whether as a halogen incandescent lamp or as an LED retrofit lamp) and to compare it with a predetermined threshold value. If the current drawn falls below this threshold, a corresponding error signal is generated by the vehicle electrical system control unit and transmitted via the communication bus 1 (CAN bus) to the electronic detection and/or control devices 3 and, in particular to the display device at the driver.

Originally, this function is adapted to the situation in which the operation of halogen bulbs was the rule. If the halogen bulb draws, for example, 3 or 4 amperes in normal operation due to the rated voltage and the specified power consumption, values in the range of, for example, 0.5 to 1 amperes can be stored as threshold values in the vehicle electrical system control unit 1 by programming or as a stored, retrievable value, depending on the manufacturer and model of the vehicle.

If the halogen bulb in the vehicle lamp is now replaced by an LED retrofit lamp, it quickly becomes apparent that the LED retrofit lamp, which itself draws only a current flow of, for example, 1A, is operated close to the range in which the on-board power supply control unit 1 is currently detecting and signaling faults.

As schematically indicated in FIG. 1, the two lines 6, 7 carrying the voltage and the base potential are usually provided with plug-in connections spatially close to the vehicle lamp, which can be mechanically disconnected. A load resistor device 5 known as such can now be inserted into these—in order to avoid the false fault detection described above in the case of LED retrofit lamps—on the side of both lines 6, 7, which, in addition to the relevant connections 11a, 11b, 12a, 12b, has only an ohmic load resistor $R_L$, via which the two voltage-carrying lines 6, 7 are connected. Thus, when voltage is applied, an additional current flows through the load resistor $R_L$ which is to be added to the current drawn from the LED retrofit lamp. This ensures that the threshold value is safely exceeded and that no erroneous lamp failure is detected and reported.

The load resistor $R_L$ can, for example, be about 8-10 ohms, so that the additional current at 12 V nominal voltage is about 1 ampere. Corresponding products currently cost about 5 to 15 € in common market portals, depending on the design. They are offered under the designation "load resistor", "CAN bus load" or "CAN bus adapter", whereby—as can be seen from FIG. 1—there is no direct connection to the CAN bus, but rather the operation of the LED retrofit lamp is made indistinguishable from the fault detection and reporting by the on-board power supply control unit 1 via the CAN bus adapter for the BCM. The electrical conduction consumed by the load resistor $R_L$ is converted into heat and dissipated to the environment. Compared with the conventional halogen incandescent lamp, however, a saving in consumed energy is still achieved.

However, a problem arises here in that the actual instantaneous power supply does not necessarily correspond to the nominal voltage (e.g. 12 or 24 V), but may well be subject to fluctuations, whereby values between 10 V and 14.5 V may be considered for a nominal voltage of 12 V, the latter for generator operation. In order to ensure an additional current of 1 A in any case to avoid the fault case, the load resistance is adapted to the lower limit value of the voltage (i.e., 10 V) in this case, i.e., 10 ohms in the example, so that 10 W power dissipation (converted into heat) occurs. However, since the power increases quadratically with the current flow (the increase in the fluctuating voltage is reflected linearly in the increase in the current), a power dissipation of 21 W is already obtained when the upper limit of 14.5 V is reached. LED lamp power and load power together can in this case come close to the power of the original halogen incandescent lamp, which they were actually intended to replace, among other things, because of the energy savings.

WO 2017/191270 A1 and US 2019/150236 A1 relate to a headlamp and a circuit arrangement for simulating a load current from an on-board power supply. However, the load current simulated with respect to the vehicle electrical system control unit does not refer to an increased current consumption of an LED requiring little current in "warm mode" but to the operation of the LED during the so-called cold lamp test.

SUMMARY

According to one embodiment, an electronic load is provided for installation in the power supply of a vehicle lamp, the electronic load comprising at least one first connection node, at least one second connection node, and a circuit designed as a current sink connected to the first and second connection nodes. In this case, the first connection node is connected to two first connection sections (12a, 12b) which are designed to be connected between respectively corresponding connection sections of a first line (6) carrying a voltage potential, and the second connection node is connected to two second connection sections (11a, 11b) which are designed to be connected between respectively corresponding connection sections of a second line (7) carrying a reference potential. A supply voltage fed to the vehicle lamp via the lines corresponds to the difference between the voltage potential and the reference potential.

The current sink circuit connected between the first and second connection nodes is set up in such a way that it causes a substantially constant current flow from the first connection node or the first connection sections to the second connection node or the second connection sections, independently of a supply voltage that varies with time. This results in a particular advantage, namely that despite the fluctuations in the voltage provided by the energy storage device (battery) and/or the voltage generator (i.e., the power supply) that often occur during driving operation, a current flow that is predetermined by suitable dimensioning of the components of the current sink or that can be specifically adjusted externally at any time is achieved during operation. As a result, the power converted by the electronic load, in particular into heat, is also independent of the fluctuations in the power supply.

To this end, the electronic load is arranged to be connectable to the first and second lines (6, 7) to provide the voltage potential and the reference potential in parallel with the vehicle lamp (8), respectively, and thus to provide a current flow in parallel with the vehicle lamp and consequently additional to the vehicle lamp.

Thus, according to this embodiment, the load no longer needs to be adjusted to a lower limit value of an interval (e.g. 10 to 14.5 volts at 12 V nominal DC voltage) of the expected, time-varying voltages and there is no longer any excessive conversion of energy into heat during operation when voltages are close to the upper limit value, especially during generator operation. The conventional oversizing of conventional load resistors thus becomes obsolete. In addition to considerable energy savings, this also makes it possible to avoid the risk of overheated load resistor devices that are improperly installed near the vehicle light.

The current sink section is designed as a constant current source, but in a narrower sense it represents a kind of counterpart to the current source. If a current source is loaded with a fixed resistor, only a fixed value for the desired load current can be set for a given load resistance. In the case of the current sink, a load current is set up so that it can be adjusted within a fixed range of voltages, whereby electronic control is used. In the simplest case, the electrical power absorbed by the electronic load or the current sink can be converted into heat. Alternatively, it can be fed back into the on-board power supply system.

Due to the electronic load proposed according to the embodiment example, an overall linear relationship is established between instantaneously supplied on-board voltage and additional power loss, which is still quadratic in the case of conventional load resistor devices according to the above. Therefore, in addition to the reduced power consumption, significantly smaller heat sinks can be set up on the electronic load than in the case of the conventional load resistor devices. This reduces the manufacturing costs for the product.

In addition, the same electronic load or current sink can be designed for constant current operation in voltage ranges that include, for example, both 12-volt and 24-volt nominal voltages. Thus, because of the independence from the supply voltage, the same product can be used for different on-board voltages in vehicles, which reduces the variety of products to be kept in stock and further reduces costs. At the same time, variability and modularity are increased. The latter is especially true if the electronic control on which the current sinking circuit is based has a current measuring resistor which alone is to be adapted for different vehicle types (and not the other electronic components of the control) in order to bring the current consumption of the lamp and load taken together in operation above the threshold value for fault detection in each case individually adapted, so that erroneous fault detections are excluded. Such a current measuring resistor can, however, be a particularly inexpensive component of the current sink, so that a further cost saving is achieved.

It should be noted that both the first and second connector sections may be configured to connect to the first and second leads, respectively. This includes primarily a purely electronic connectivity. However, according to various embodiments, mechanical connectivity may be added thereto, i.e., the terminals or terminal sections are encapsulated in connector parts (male and/or female) that mate with corresponding connector parts (corresponding to female and/or male) provided on the lines carrying the supply voltage. Furthermore, it should be taken into account that when the electronic load is used, i.e., when connecting, existing connectors in the lines are released and the connection sections are inserted by means of their own connector pairs between the open, and matching to the connector pair of the electronic load, connectors of the lines. The first or second connection sections each comprise at least two connections which interconnect the voltage-carrying, and in this case mutually separated parts of the lines.

According to a special embodiment of the electronic load, the current sink circuit has a power transistor as load. This can, for example, advantageously be controlled so that an essentially constant current flows through it. Cost-effective and at the same time high-performance solutions are also available on the market here. In particular, the power transistor can be a power MOSFET.

According to a further development of the embodiment, the electronic load comprises a shunt regulator, wherein the power transistor described above is controlled by the shunt regulator. This makes it possible to perform current measurement via a shunt and determination of the relevant feedback to the power transistor in a particularly direct but simple manner.

According to a particular further development of the above embodiment, the current sink circuit for measuring a current currently flowing comprises a shunt resistor connected in series with the collector-emitter junction or the source-drain junction of the power transistor, one terminal of which is connected to the second terminal for connection to the second line carrying the reference potential, and the other terminal of which is connected to an adjustment input of the shunt regulator.

According to another specific further embodiment of the aforementioned embodiment, in the electronic load, an anode terminal of the shunt regulator is connected to the second terminal for connection to the second line carrying the reference potential. Further, a cathode terminal of the shunt regulator may be connected to a gate terminal of the power transistor. Furthermore, the cathode terminal of the shunt regulator may be connected via a further resistor to the first terminal for connection to the first line carrying the voltage potential of the supply voltage. The shunt regulator can obtain its low current requirement via this further resistor. The proposed structure is particularly simple and efficient.

According to one embodiment, the shunt regulator is a TL431 type precision shunt regulator device, such as those sold by Texas Instruments (see, for example, data sheet "TL431/TL432 Precision Programmable Reference", document "SLVS543P-August 2004-revised November 2018", last downloadable from https://www.ti.com/lit/gpn/tl431 on Jul. 29, 2020). This device is a voltage regulator and operates similarly to a Zener diode, but is equipped with a third pin that allows it to be adjusted. This third pin is referred to here as the adjustment input, where a reference voltage can be input. In the embodiment example, this is the shunt measurement voltage tapped at the shunt resistor on the anode side. The TL431 shunt regulator offers particular advantages: in addition to the adjustability of the voltage between its anode and cathode terminals, it supplies a voltage range between 2.5 V and 36 V that is particularly suitable in the present application and is continuously adjustable. Furthermore, it is designed for temperatures between −40° C. and +125° C., which is additionally useful in the vehicle application, and is available on the market as a standard component at low cost. In the circuitry proposed in these design examples, it provides an inexpensive but particularly efficient current sink circuit.

According to another embodiment, the electronic load comprises an electronic switch which is arranged to selectively open and close a connection of a gate terminal of the power transistor to the reference potential. This embodiment makes it possible to selectively turn off the load current. This makes it possible to avoid unnecessary power consumption when an actual lamp fault is detected (i.e., when the vehicle lamp actually fails), and also to have the fault detection system of the on-board power system control unit effectively detect and report the fault, i.e., in this case, to cause the on-board power system control unit to properly generate a fault signal.

According to another embodiment, in the electronic load the current sink circuit is designed as a fully integrated two-pole. This allows it to be manufactured in large numbers and inexpensively ICs and used as a current sink. Moreover, this solution is space-saving.

According to a further embodiment of this embodiment, the electronic load comprises an electronic switch formed in the fully integrated two terminal, or formed between the two terminal and the first terminal, or formed between the two terminal and the second terminal, wherein the electronic switch is adapted to disable or allow current flow through the two terminal by selectively opening and closing.

Similar to what is described above with reference to the electronic switch, this embodiment also makes it possible to selectively turn off the load current. This makes it possible to avoid unnecessary power consumption when an actual lamp fault is detected (i.e., when the vehicle lamp actually fails) and also allows the fault detection of the vehicle electrical system controller to effectively detect and report the fault.

According to a further embodiment, the electronic switch is controlled in accordance with the above embodiments by a microcontroller or a circuit comprising discrete electronic components. Such a controller or circuit may be designed to detect the failure of the vehicle lamp, for example by receiving or measuring information about the current drawn only from the vehicle lamp.

In another embodiment, an electronic load as described above is combined with a vehicle lamp. In this case, the vehicle lamp is an LED retrofit lamp, and the electronic load is designed to be connectable in parallel with the vehicle lamp to the first and second lines supplying the supply voltage. This allows the electronic load to draw a substantially constant load current in parallel with the lamp that is independent of fluctuations in the vehicle electrical system voltage, thus ensuring a current consumption that exceeds the threshold value of the measurement for fault detection of a failed lamp during lamp operation by the vehicle electrical system controller. The combination therefore avoids erroneous fault detection in the case of an LED retrofit lamp and, at the same time, reduced energy consumption.

The electronic load and the vehicle lamp can form a coordinated unit here, even if both are installed separately in the vehicle, because the electronic load, unlike the vehicle lamp, is preferably placed outside the vehicle lamp due to heat generation. This aspect of coordinated units is particularly advantageous if, as described, an electronic switch is provided that switches off the load current at the same time due to the lamp current no longer drawn by the vehicle lamp. Furthermore, coordination with each other can be achieved by setting the reference voltage at the shunt regulator in such a way that the load current and the expected lamp current determined by this are sufficient to exceed the threshold value of the vehicle electrical system controller.

Another embodiment provides for a combination of an electronic load as described above with an on-board power system control unit of a vehicle, a vehicle lamp, and first and second lines connecting the on-board power system control unit and the vehicle lamp. Thus, this combination comprises the on-board power system control unit, which is arranged to communicate with further detection and/or control units in a vehicle via a communication bus, and which is arranged to control the operation of at least one vehicle lamp. Further, the vehicle lamp, wherein the vehicle lamp is an LED retrofit lamp. Further, it comprises the first line (6) carrying a voltage potential and the second line (7) carrying a reference potential, the lines each being electronically connected to the on-board power system control unit (1) and the on-board power system control unit (1) providing the voltage potential and the reference potential, respectively. Finally, it also comprises the electronic load itself, wherein the electronic load is designed to be connectable in parallel with the vehicle lamp to the first and second lines carrying the voltage potential and the reference potential, respectively. The same advantages are obtained as described above, except that now all components involved in the lamp operation can be coordinated with each other.

According to a further embodiments, the on-board power supply control unit is configured to perform a cold lamp test and/or a pulsed power supply operating mode with respect to the vehicle lamp.

According to a further embodiment, there is provided a method for avoiding an error signal due to a lamp current being pulled below a predetermined threshold in the vehicle electrical system controller when a conventional vehicle lamp for incandescent or halogen lamps is equipped with a retrofit-style vehicle lamp comprising a semiconductor light source, the method comprising:

Providing a supply voltage between a first terminal section and a second terminal section configured to be connectable to a vehicle lamp adapted to receive a lamp;

lowering an electrical current between the first and second terminal sections such that a substantially constant current flow is maintained from the first terminal section to the second terminal section regardless of a varying supply voltage over time.

Here, the same advantages as described above are obtained. According to a further development, the method comprises a step of installing a vehicle lamp with a semiconductor light source in the vehicle lamp. This may be an LED retrofit lamp.

According to a further embodiment, the method comprises a step of applying electric current to the vehicle lamp while preventing an electric current detected between the first and second terminals from falling below a predetermined threshold. As described, this can prevent erroneous fault detection affecting the vehicle lamp and still keep the energy consumed during operation low.

Further advantages, features and details of the various aspects are apparent from the claims, from the following description of preferred embodiments and from the drawings. In the figures, the same reference signs denote the same features and functions.

DETAILED DESCRIPTION OF ILLUSTRATIVE EMBODIMENTS

In the following description of preferred embodiments, it should be understood that the present disclosure of the various aspects is not limited to the details of the structure and arrangement of the components as shown in the following description and figures. The embodiments may be put into practice or carried out in various ways. It should further be appreciated that the expressions and terminology used herein are used for the purpose of specific description only, and these should not be construed as such in a limiting manner by those skilled in the art.

FIG. 1 shows an arrangement comprising an on-board power supply control unit 1, a vehicle lamp 8, and lines 6, 7 connecting these, which was described at the beginning, and whose description is also relevant for understanding for the embodiment described here. The vehicle lamp 8 shown is an LED retrofit lamp and has LEDs 10a, 10b, 10c etc. The number and interconnection of the LEDs 10a-10c is arbitrary. The first line 6 carries a voltage potential and the second line 7 carries a ground potential. The supply voltage fed to the vehicle lamp 8 from the power supply 4 (battery, generator) by the on-board power supply control unit 1 results from the difference between the voltage potential and the ground potential. Detachable connection points are arranged in each of the two lines 6, 7 by connectors, and connection sections 12a, 12b and 11a, 11b, respectively, of a load resistor device 5 are connected to the connection points of the lines 6, 7 between the connection points detached here. As a result, the load resistor device 5 with its load resistor $R_L$ as the only component included is connected in parallel with the vehicle lamp.

Figure 2:
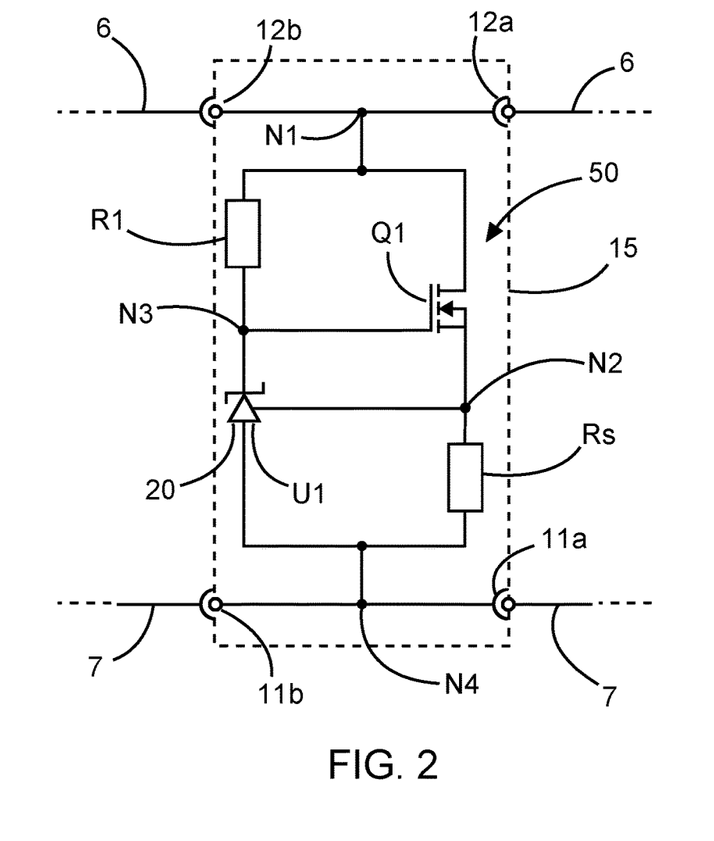
FIG. 2 block diagram of an electronic load according to a first embodiment, which can replace the load resistor device in FIG. 1.

A first embodiment of an electronic load 15 is shown in FIG. 2. In the arrangement shown in FIG. 1, the electronic load 15 can advantageously be installed instead of the load resistor device 5. Accordingly, the structure of the connection sections 12a, 12b or 11a, 11b is similarly designed. In all other respects, the same reference signs denote the same or similar components or structures here and also in the following, and unnecessary or redundant repetition of the description of these components or structures will be dispensed with as far as possible in the following.

The first connection sections 12a and 12b of the electronic load are designed to be connected to the first line 6 and are also shown connected in FIG. 2. The two connection sections 12a and 12b are connected to each other by a partial line, which thus conducts the supplied voltage potential to the vehicle lamp 8. The same structure can be seen on the side of the second line 7 and the connection sections 11a and 11b, where the basic potential is supplied to the vehicle lamp 8 through the connection. The connection sections 11a, 11b, 12b, 12b are preferably encapsulated in matching connector parts (female and/or male, male and/or female, etc.) to allow safe interconnection between the disconnected parts of the two lines 6 and 7.

The electronic load 15 forms a two-terminal circuit with an anode-side first connection node N1 connected to the two first connection sections 12a, 12b and a cathode-side second connection node N4 connected to the two second connection sections 11a, 11b. The electronic components arranged between these connection nodes N1 and N4 form a current sink circuit 50. In operation, the load current flows from the first line 6 via the first connection section 12b and the first connection node N1 via a drain-source junction of a power transistor Q1, another node N2, a shunt resistor $R_s$ to the second connection node N4 and via the second connection section 11b back into the second line 7. The power transistor Q1 is an n-channel power MOSFET and forms the actual load.

The source terminal of the power transistor Q1 is connected to the anode-side terminal of the shunt resistor $R_s$ via the further node N2. The resistance value of the shunt resistor $R_s$ is comparatively low. Depending on the load current, a potential is therefore formed at node N2 which is representative of the load current and is used to control power transistor Q1.

Figure 3:
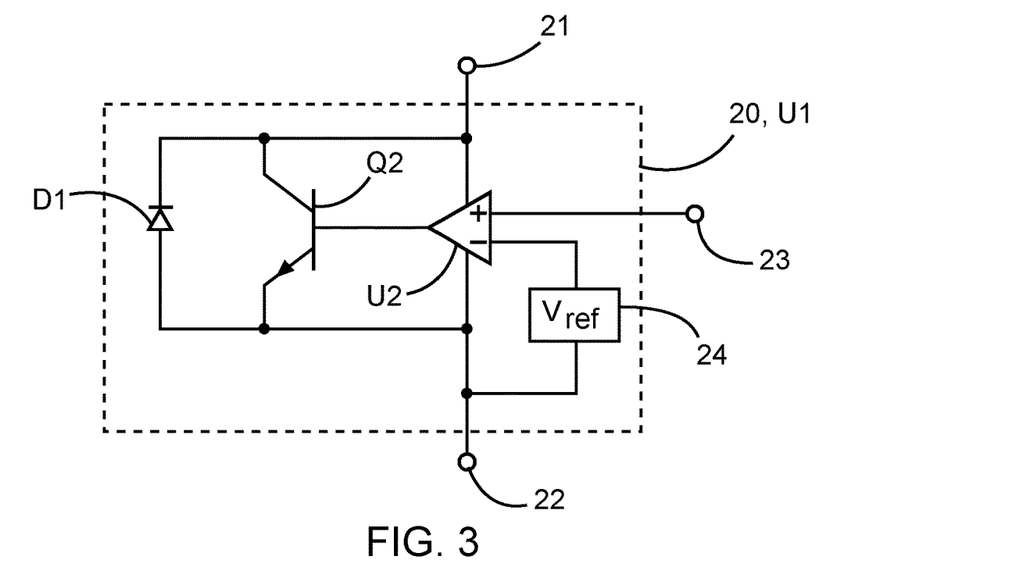
FIG. 3 schematic circuit diagram of the shunt controller shown in the first embodiment of FIG. 2.

The cathode-side second connection node N4 is connected to the cathode-side connection of the shunt resistor $R_s$, but also to an anode connection 22 of a shunt regulator 20, which is shown in greater detail in FIG. 3. The shunt regulator 20—also denoted here by reference U1—is a voltage regulator that opens or closes depending on a comparison between a measurement voltage input at its adjust pin 23 and an internally specified reference voltage $V_{ref}$, supplied by a component 24 (here, for example: 2.5 V). The type shown here is a TL431 device (Texas-Instruments) particularly suitable for the application at hand. However, voltage regulators other than the TL431 with a similar function can be included just as well.

The shunt regulator 20 functions similarly to adjustable Zener diode. The comparison is performed by a comparator U2 whose output controls the base of an npn bipolar transistor Q2 whose collector-emitter path in turn connects the anode terminal 22 and a cathode terminal 21 of the shunt regulator 20. If the measurement voltage is greater than the reference voltage $V_{ref}$, then the bipolar transistor Q2 opens and the potential at the cathode terminal is pulled down, otherwise it blocks. The measurement voltage at the adjustment input 23 is obtained directly from the node N2 to which it is connected.

The cathode terminal 21 is connected to a node N3, which in turn is connected to the gate terminal of the power transistor Q1. The power transistor Q1 is thus controlled via the voltage occurring at node N3. If, in the example, a load current flows that is 0.1 A higher than a target load current of 1 A, and the shunt resistor $R_s$ is dimensioned (e.g. 2.5 ohms) such that the measurement voltage dropping at node N2 and thus at the adjustment input 23 is higher than the reference voltage $V_{ref}$, then the voltage present at the cathode terminal 21 of the shunt regulator 20 as well as at node N3 and thus at the gate of the power transistor Q1 is pulled down so that the power transistor becomes more highly resistive and the load current drops again. Deviations of the load current downwards are compensated analogously. In this case, power is supplied to the shunt regulator 20 by another resistor R1, whose anode-side terminal is connected to the anode-side node N1, and whose cathode-side terminal is connected to the node N3. The value of resistor R1 is, for example, 4700 ohms.

The control described maintains a very constant load current over a wide temperature range of −40° C. to +125° C., which can be enormously important given the general temperatures in the engine compartment of internal combustion engines, under the usual outside temperatures of vehicles, and under the conditions of heat generation and cooling of the component itself.

Figure 4:
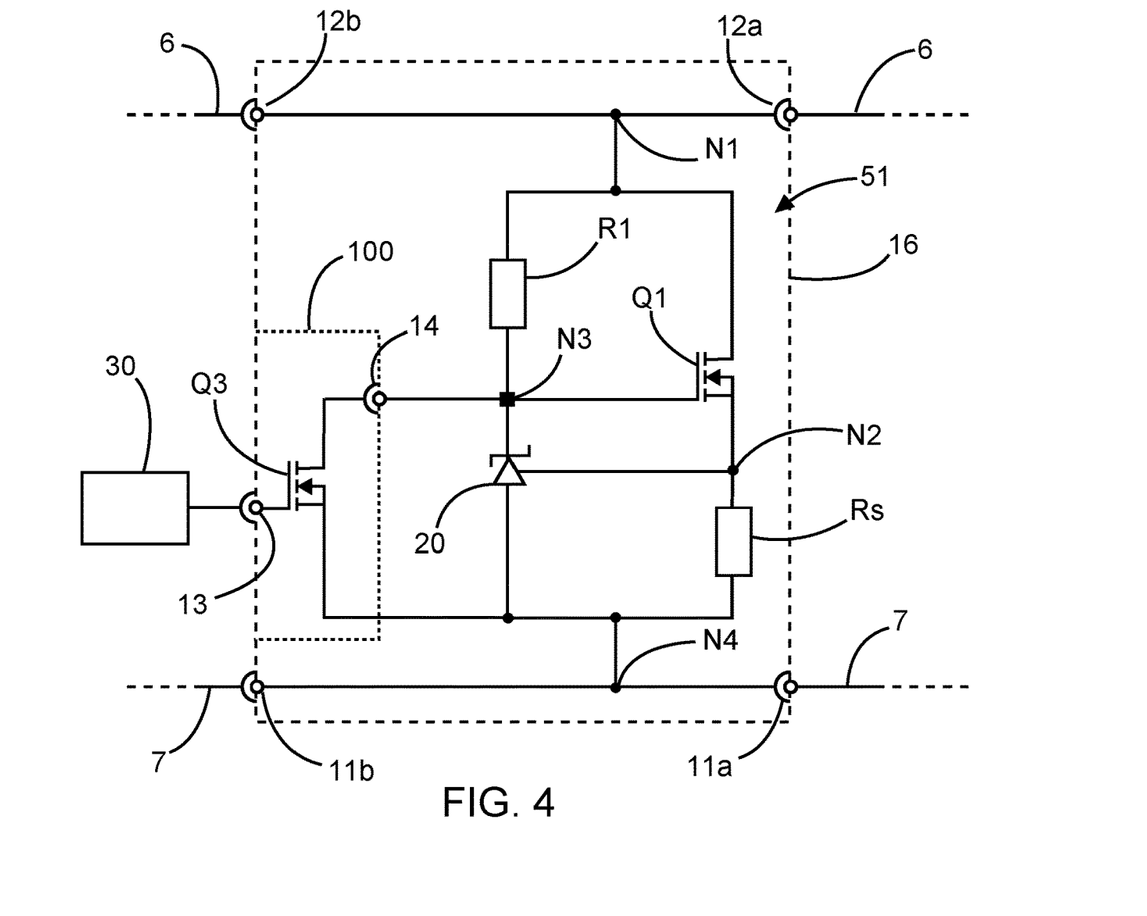
FIG. 4 block diagram showing an electronic load according to a modified first embodiment.

A modified first embodiment example of an electronic load 16 with a current sink circuit 51 is shown in FIG. 4. The modified first embodiment example differs from the first embodiment example in that there is a further tap at node N3, which leads to an electronic switch Q3 configured as an n-channel MOSFET. In the example, this is a part 100 of the electronic load 16. The current sink circuit 51 corresponds in structure and function to the current sink circuit 50 of the first embodiment example.

The source-drain path of electronic switch Q3 connects node N3 to node N4, which carries the ground potential during operation. In the example, the gate terminal of the electronic switch is connected to an external microcontroller 30 via a third terminal section 13 of the electronic load, which can selectively close or open the electronic switch Q3. Depending on this, the potential at node N3 can be selectively pulled to the ground potential with the result that the power transistor Q1 completely blocks the load current. This switching may occur, for example, when it has been detected by the microcontroller 30 that the vehicle lamp 8 has failed.

Alternatively, the electronic switch Q3 as well as the microcontroller 30 may be provided externally from the electronic load 16—considered as a product unit. In this case, the electronic load as such comprises only the connection section 14, as shown in FIG. 4. However, the function remains the same as described above. On the other hand, however, both the microcontroller 30 and the electronic switch Q3 may also be provided in the electronic load 16—considered as a product unit. In this case, a measuring and evaluation device (not shown) connected to the microcontroller 30 could also be additionally provided, which measures a lamp current passing through the connection sections 11a, 12a. Instead of the microcontroller 3o, a circuit arrangement 31 of discrete components shown in FIG. 6 could also be provided, by means of which the load current is deactivated.

Figure 5:
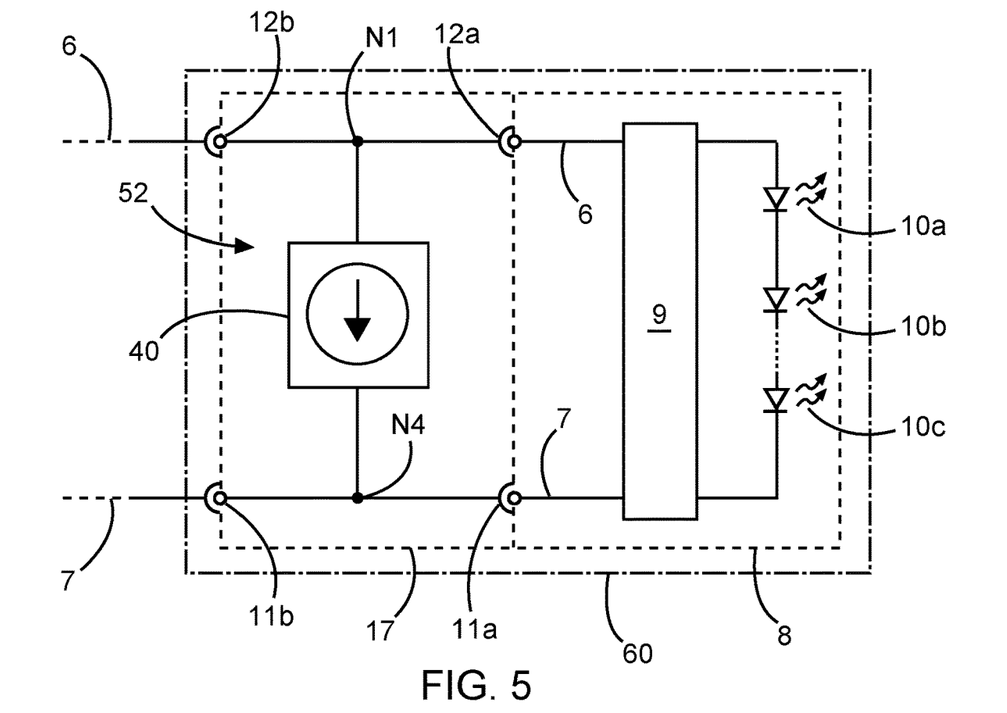
FIG. 5 block diagram with an electronic load as in FIG. 2, but according to a second embodiment.

A second embodiment example of an electronic load 17 with current sink circuit 52 is shown in FIG. 5. The difference to the first embodiment example is that the current sink circuit 52 is designed as a fully integrated two-terminal 40. Otherwise, the function is identical to that of the first embodiment example.

Figure 6:
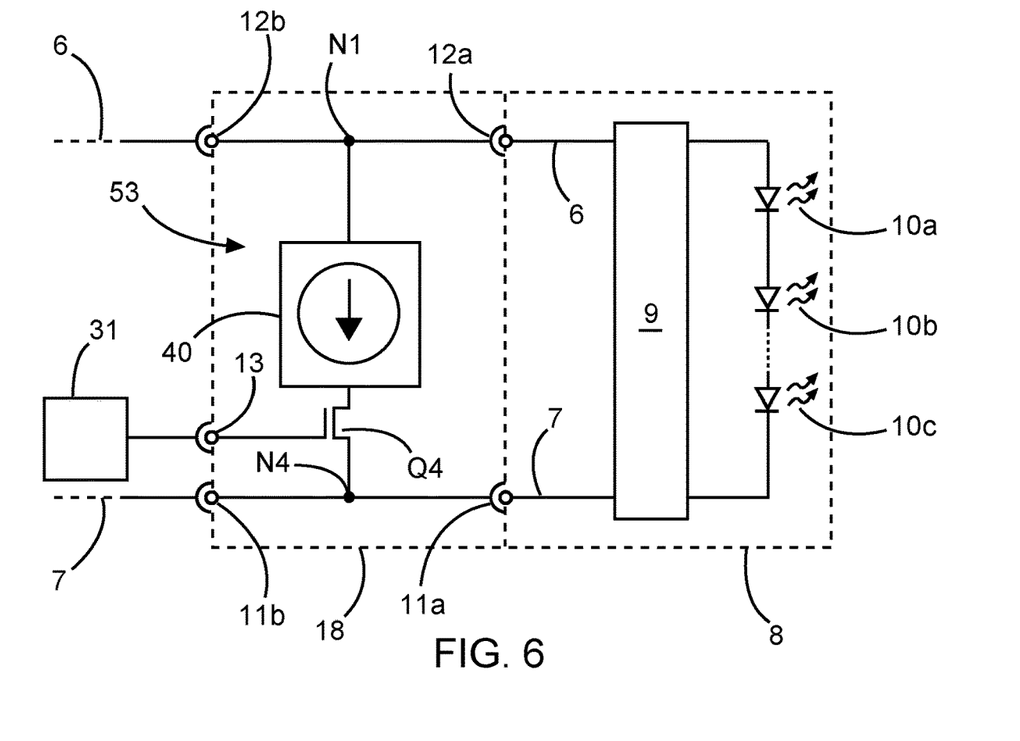
FIG. 6 block diagram with an electronic load as in FIG. 5, but according to a modified second embodiment.

A modified second embodiment of an electronic load 18 with current sink circuit 53 is shown in FIG. 6. Here, too, the current sink circuit 53 is designed as a fully integrated two-pole 40. The difference from the second embodiment example is that-similar to the modified first embodiment example—a circuit arrangement 31 of discrete components (or a microcontroller 30) can be provided, which controls an electronic switch Q4 via a third connection section 13, by which the load current can be switched off. The position of the electronic switch Q4 within the electronic load 18 can be arbitrary.

The electronic load proposed in the embodiments of this application represents in a certain way a so-called warm filament simulator. In normal operation, it simulates or reflects the presence and, if necessary, the functioning of a conventional halogen lamp with filament, as described above, to the on-board power supply control unit, which detects the load current for fault detection.

In a cold lamp test, on the other hand, voltage pulses are emitted at irregular short intervals by the vehicle electrical system control unit while the lighting is actually switched off in order to measure whether the lamps are absorbing power, i.e. whether they are intact. The voltage pulses are so short that conventional filaments do not emit any light due to their time inertia (duration until the temperature at which light is emitted is reached) in order to avoid undesirable lighting effects. In this case, however, the LEDs of a retrofit lamp react immediately to the applied voltage, which is why they emit short flashes of light without further measures in the circuit design, which is undesirable and can lead to obstruction of other road users in traffic.

Therefore, a suggestion goes—as it is described e.g. in the national German patent application DE 10 2019 206 461.2, the disclosure content of which is fully included here by explicit reference, but in particular the FIGS. 1 and 2 shown therein and the associated detailed description—to set up an electronic switch (there an n-channel MOSFET), which directly or indirectly switches off or deactivates the LEDs of the retrofit lamp during voltage pulses, as well as in series to the switch a resistor (there "R1"), which is current-carrying during the voltage pulse with closed switch and thus simulates the load of a cold filament. The switch itself is controlled by another electronic switch that opens or closes depending on a state of charge of a capacitor that is part of a low-pass filter. In cold lamp mode, its state of charge is too low and the further electronic switch (e.g., ebf. an n-channel MOSFET) is open, as a result, in the circuitry, the gate terminal of the actual electronic is pulled to a raised voltage potential and it closes to disable the LEDs. In normal operation (voltage permanently applied), the charge state of the capacitor in the low-pass filter is sufficient to open this electronic switch controlling the actual lamp operation via the further electronic switch and thus activate the LEDs. This circuit arrangement thus represents a so-called cold filament simulator.

Now, what is special about the present aspect is that the proposed electronic load is fully compatible with such a cold spiral simulator (as shown, for example, in FIG. 1 or 2 of DE 10 2019 206 461.2). That is, the operation and function of the hot-spiral simulator described herein has no adverse effect on the operation of the cold-spiral simulator and vice versa. The electronic load is connected in parallel with the LEDs, and the cold filament resistor is connected in series, for example. In cold lamp operation, the electronic load does respond to the voltage pulses, but this is also necessary to prevent erroneous fault detection during the voltage pulse in the on-board power supply control unit. On the other hand, the voltage waveforms applied to the LED(s) and to the cold filament simulator circuit are not affected.

In the case of power supply to the lighting in PWM mode (pulse width modulation), which can be provided for temporary energy saving, the electronic load also proves to be advantageous because it interferes far less with load operation than conventional load resistor devices. The electronic load according to the embodiment examples can therefore be combined with particular advantage with LED retrofit lamps that have a cold filament simulator whose low-pass filter is preferably also set to PWM operation.

Although a preferred embodiment of the present disclosure has been described, it is understood that various changes, adaptations and modifications may be made thereto without departing from the spirit of the disclosure and the scope of protection of the appended claims. Therefore, the scope of protection of the disclosure should not be determined by reference to the above description, but should instead be determined by reference to the appended claims together with their full scope of protection of equivalents. Further, it is understood that the appended claims do not necessarily encompass the broadest scope of protection of the disclosure that the applicant is entitled to claim, or the only way in which the disclosure can be claimed, or that all of the features listed are necessary.

The invention claimed is:

1. An electronic load for installation in a power supply of a vehicle lamp, the electronic load comprising:
   a first connection node connected to two first connection sections adapted to be connected between respective corresponding connection sections of a first line carrying a voltage potential;
   a second connection node connected to two second connection sections adapted to be connected between respective corresponding connection sections of a second line carrying a reference potential, wherein a difference between the voltage potential and the reference potential comprises a supply voltage configured to be supplied to the vehicle lamp; and
   a current sink circuit coupled between the first and second connection nodes, the current sink circuit configured to cause a substantially constant current flow independently of a time-varying supply voltage from at least one of the first connection sections to at least one of the second connection sections,
   wherein the electronic load is connectable to the first and second lines in parallel with the vehicle lamp.

2. The electronic load according to claim 1, wherein the current sink circuit comprises a power transistor as a load.

3. The electronic load according to claim 2, wherein the power transistor is a power MOSFET.

4. The electronic load according to claim 2, further comprising a shunt regulator configured to control the power transistor.

5. The electronic load according to claim 4, wherein the current sink circuit has a shunt resistor connected in series with a collector-emitter junction or a source-drain junction of the power transistor, wherein one terminal of the shunt resistor is connected to the second connection node, and wherein another terminal of the shunt resistor is connected to an adjustment input of the shunt regulator.

6. The electronic load according to claim 4,
   wherein an anode terminal of the shunt regulator is connected to the second connection node, and
   wherein a cathode terminal of the shunt regulator is connected to a gate terminal of the power transistor and via a further resistor to the first connection node.

7. The electronic load according to claim 4, wherein the shunt regulator is a precision shunt regulator module of type TL431.

8. The electronic load according to claim 2, further comprising an electronic switch configured to selectively open and close a connection of a gate terminal of the power transistor to the reference potential.

9. The electronic load according to claim 1, wherein the current sink circuit is a fully integrated two-pole.

10. The electronic load according to claim 9, further comprising an electronic switch integrated in the fully integrated two-pole, or arranged between the two-pole and the first connection node or arranged between the two-pole and the second connection node, wherein the electronic switch is configured to prevent or allow a current flow through the two-pole.

11. The electronic load according to claim 10, wherein the electronic switch is controlled by a microcontroller or a circuit with discrete electronic components.

12. The electronic load according to claim 1, wherein the vehicle lamp is an LED retrofit lamp.

13. A system comprising:
   the electronic load according to claim 1;
   an on-board power supply controller of the vehicle; and
   the vehicle lamp and the first and second lines connecting the on-board power supply controller and the vehicle lamp,
   wherein the on-board power supply controller is configured to communicate with further detection and/or control units in the vehicle via a communication bus and to control operation of the vehicle lamp,
   wherein the vehicle lamp is an LED retrofit lamp,
   wherein each of the lines is electronically connected to the on-board power supply controller, and
   wherein the on-board power supply controller is configured to provide the voltage potential and the reference potential accordingly.

14. The electronic load according to claim 13, wherein the on-board power supply controller is configured to perform a cold lamp test and/or a pulsed power supply operating mode with respect to the vehicle lamp.

15. A method for avoiding an error signal due to a lamp current being pulled below a predetermined threshold in an on-board power supply controller of a vehicle when a vehicle incandescent or halogen light is equipped with a retrofit-style vehicle lamp having a semiconductor light source, the method comprising:
   providing a supply voltage between a first terminal and a second terminal connected to the vehicle lamp; and
   lowering an electrical current between the first and second terminals such that a substantially constant current flow from the first terminal to the second terminal is maintained regardless of a varying supply voltage over time.

16. The method according to claim 15, further comprising installing the vehicle lamp with the semiconductor light source in a vehicle light.

17. The method according to claim 15, further comprising applying electric current to a vehicle light while preventing an electric current detected between the first and second terminals from falling below the predetermined threshold.

* * * * *